United States Patent [19]

Eisenberg et al.

[11] 4,152,217
[45] May 1, 1979

[54] AMINE REGENERATION PROCESS

[75] Inventors: Benjamin Eisenberg, Morris Plains; Russell R. Johnson, Mountainside, both of N.J.

[73] Assignee: Exxon Research & Engineering Co., Florham Park, N.J.

[21] Appl. No.: 920,692

[22] Filed: Jun. 30, 1978

[51] Int. Cl.$^2$ .......................... B01D 3/42; C01B 17/16
[52] U.S. Cl. ............................................ 203/2; 203/42; 203/DIG. 9; 203/23; 423/228; 423/229
[58] Field of Search ................................ 423/228, 229; 203/DIG. 9, 2, 42, 39, 23; 202/160

[56] References Cited

U.S. PATENT DOCUMENTS

| | | | |
|---|---|---|---|
| 2,684,326 | 7/1954 | Boyd | 203/2 |
| 2,797,188 | 6/1957 | Taylor et al. | 423/228 |
| 2,886,405 | 5/1959 | Benson et al. | 423/228 |
| 3,565,573 | 2/1971 | Thirkell | 423/229 |
| 3,829,521 | 8/1974 | Green | 423/228 |

Primary Examiner—Wilbur L. Bascomb, Jr.
Attorney, Agent, or Firm—J. H. Callwood

[57] ABSTRACT

Impurities such as hydrogen sulfide and carbon dioxide are removed from fluids such as natural gas, synthesis gas or liquid or gaseous hydrocarbons by contact with an aqueous alkanolamine solution which absorbs said impurities from the fluid. The resultant spent impurity-enriched absorbent amine stream containing the absorbed impurities is split into two streams; one stream being routed directly to the top of an amine regenerator column and the second stream being routed to a heat exchanger where it is heated en route to an intermediate point of the regenerator column by heat exchange with the hot regenerated solution coming from the bottom of the regenerator column. The spent amine stream which is passed without prior heating directly to the top of the regenerator column is heated by condensing steam in the column which would normally escape therefrom, thereby reducing the amount of "saturation" steam which is lost from the system. Reducing the losses of "saturation" steam in combination with heating a portion of the spent absorbent amine stream by heat exchange with the hot regenerated solution reduces the overall energy requirements for the system.

7 Claims, 2 Drawing Figures

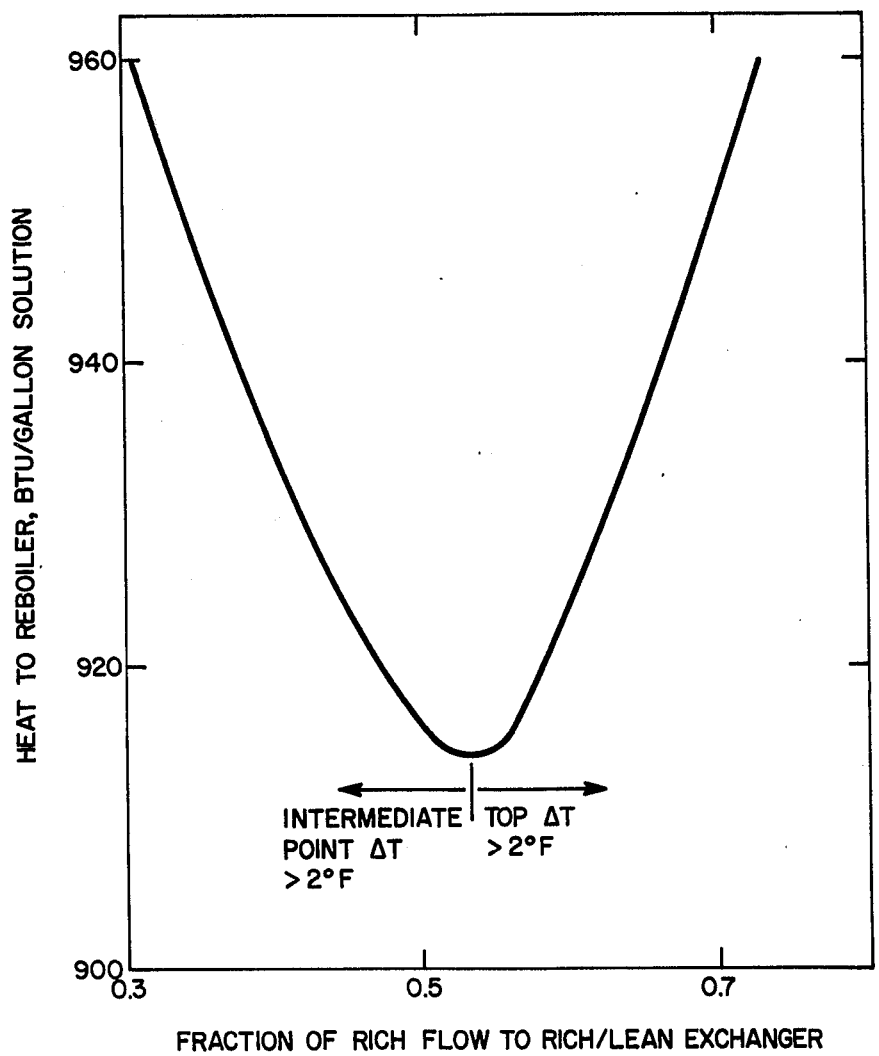

AMINE REGENERATION PROCESS

BACKGROUND OF THE INVENTION

1. Field of the Invention

This invention relates to the removal of impurities from a gas or a liquid. More particularly, the invention is concerned with an improved process for the regeneration of an amine which has been utilized as an absorbent in the removal of impurities such as $H_2S$ and/or $CO_2$ from a gas or liquid.

2. Description of the Prior Art

Various operations for the recovery of substantially pure gaseous or liquid streams by chemical treating or selective solvent treatment of an impure gaseous or liquid stream are known. U.S. Pat. No. 2,860,030 to Walter A. Goldtrot, Nov. 11, 1958 describes such processes or methods using amines.

In the known absorption operations, the enriched absorbent or solvent, after being withdrawn from the absorber column, is passed into a regenerator column where the absorbed $H_2S$ and/or $CO_2$ are stripped by countercurrent contacting with steam. The steam is generated at the bottom of the regenerator column by boiling the solution in an indirectly heated tubular heat exchanger or "reboiler". The heat for this boiling may come from steam, or from any hot fluid, or from direct firing. The countercurrent contacting with steam in the regenerator column, followed by boiling, will strip the $H_2S$ and or $CO_2$ from the solution down to a very low residual level. The hot stripped solution, known as "lean solution" is withdrawn from the reboiler, cooled, and sent back to the absorber column to complete the cycle of absorption and regeneration. Cooling to a temperature of 120° F. or lower is essential when using alkanolamines since their capacity for absorbing acid gases decreases with increasing temperature. The alkanolamine, which has a boiling point substantially higher than that of water, will remain almost completely in the liquid phase, with only traces appearing in the vapor.

As the steam generated in the reboiler passes up the regenerator column, a portion of it condenses, giving up its latent heat of vaporization to the absorbent liquid. The amount of heat given up will be equal to the sum of the amount required to heat the absorbent liquid from the temperature at which it enters the regenerator column to the boiling temperature in the reboiler plus the amount required to supply the chemical heat of reaction to decompose the amine/acid gas compounds, releasing the acid gas as a vapor.

The remaining steam will pass overhead from the regenerator column, mixed with the acid gas stripped from the absorbent liquid. The minimum amount of steam that can be present in this mixture is the amount required to saturate it at the temperature of the incoming spent absorbent stream. The higher this temperature, the greater the proportion of steam to acid gas required to give a saturated vapor. A saturated vapor is one in which the partial pressure of water vapor is equal to the vapor pressure of water above the solution at the same temperature. The rising steam vapors cannot be cooled by the absorbent liquid to a temperature lower than that of the incoming spent absorbent stream, therefore the higher this temperature, the greater the amount of steam that must leave the regenerator column with the acid gas.

In current widely accepted design and operating procedures, it is generally held that to obtain an adequate degree of stripping in the regenerator column, a substantial excess of steam in the overhead over the saturation amount is required. For example, in *Gas Purification*, 2nd Edition, by Fred C. Riesenfeld and Arthur L. Kohl, published by Gulf Publishing Co., Copyright 1960 through 1974, the authors specify that the volume ratio of steam to acid gas in the regenerator column overhead, known as the reflux ratio, should be in the range of 2:1 to 3:1 to obtain adequate stripping of monoethanolamine solution. This compares with the minimum, saturation reflux ratio for a column operating with a top pressure of 29.7 psia as follows:

| Temperature of Solution Entering Regenerator | Reflux Ratio At Saturation |
| --- | --- |
| 190° F. | 0.425 |
| 200 | 0.515 |
| 210 | 0.770 |
| 220 | 1.110 |

If the steam generated in the reboiler is in excess of the amount required for heating the absorbent liquid from the temperature at which it enters the regenerator column to the reboiler temperature, plus the heat of reaction to vaporize the absorbed acid gases, plus the saturation steam at the temperature of the entering spent rich absorbent liquid, then the temperature of the vapor rising in the regenerator column will not be reduced to the temperature of the entering absorbent liquid, but it will remain at a higher level, equivalent to its dew point temperature with respect to the absorbent liquid. For a 20 percent monoethanolamine solution, at 29.7 psia, if the reboiler steam is increased to give a reflux ratio of 2.0, the top vapor temperature will be 232° F., while at 3.0, it will be 239° F., even though the temperature of the rich solution entering the regenerator may be lower than these values.

Since the cost of heat for regenerating the solution typically represents as much as two-thirds of the variable operating cost for an amine treating system, there is an economic incentive to reduce this heat to the minimum. However, it cannot be reduced to a value less than the total required to satisfy the three requirements enumerated; to heat the spent solution to the temperature of the reboiler, to supply the heat of reaction for releasing the acid gases from solution, and to supply at least the amount needed to saturate the overhead vapor at the temperature of the entering solution.

Since the hot lean solution leaving the reboiler at a temperature in the range of 230° to 280° F. must be cooled below 120° F., it is a further widely accepted aspect of current design to do a portion of this cooling by passing the hot lead stream through a heat exchanger where it gives up heat to the entire spent rich absorbent stream coming from the bottom of the absorber. Any heat absorbed by the rich absorbent stream in this exchanger increases the temperature at which it enters the regenerator column, reducing the amount of steam required to be condensed in the column to bring the absorbent stream up to the temperature of the reboiler.

Several attempts have been made to reduce the overall cost associated with the regeneration of absorbent liquid streams. In U.S. Pat. No. 3,690,861 the patentee sought to reduce capital investment costs by devising a system in which the spent absorbent/lean absorbent heat exchanger, the overhead cooler-condenser, the reflux drum, and the reflux pump, ordinarily constructed and used with a conventional stripper or regenerator, could be eliminated. This was accomplished by passing the entire spent absorbent liquid directly to the top of the regenerator column without prior essential heating by a heat exchanger. In the process as outlined heat exchange by gas liquid contact was substituted for the heat exchange normally practiced in the usual spent absorbent/lean absorbent exchanger, thereby eliminating the cost of the heat exchanger and associated equipment.

While capital investment was considerably reduced in the process of U.S. Pat. No. 3,690,816 no consideration was given to how the elimination of heat exchangers would affect overall heat requirements of the system. In fact, it has been found that elimination of heat exchangers increases the overall heat requirements of the system.

Thus, while initial capital expenditures are considerably lessened, long term operating expenses, especially in view of rising energy costs, would be higher in the process of U.S. Pat. No. 3,690,816.

In accordance with the present invention it has been found that contrary to prior art processes in which the entire spent absorbent stream was preheated to optimize energy requirements, a substantial reduction in overall energy requirements can be realized by heating only a portion of the impurity-rich absorbent stream and passing it to an intermediate point of the regenerator column and passing a portion of said spent absorbent stream without prior heating directly to the top of the regenerator column. It has furthermore been found that the proportions of the split between preheated and unheated streams, and the quantity of heating medium supplied to the reboiler can both be controlled near their optimum values by measuring and controlling two temperature differences by use of conventional temperature measuring devices.

SUMMARY OF THE INVENTION

A process for reducing the overall heat energy requirement in an amine absorption-regeneration process in which the spent impurity-enriched absorbent stream is split into two streams, one being passed without heating to the top of the regenerator column, and the other, after heating by heat exchange with the hot lean absorbent stream from the bottom of the regenerator column, being passed to a lower, intermediate point in the regenerator column. The split flow arrangement maximizes recovery of heat from the hot lean absorbent, and at the same time maximizes recovery of heat from the stripping vapors in the regenerator column, thereby minimizing the heat requirement of the system. Control of the proportions of the split, and also of the heat supplied to the reboiler at the bottom of the column, is effected by continuously measuring the temperature difference between the vapor leaving the top of the column and the unheated portion of the rich absorbent liquid entering the top of the column, and also the temperature difference between the vapor rising at the lower intermediate point in the column where the heated portion of the rich absorbent liquid is introduced, and the temperature of the heated rich absorbent liquid at its point of introduction. The proportions of the split, and the heat flow to the reboiler are regulated so as to keep these two temperature differences at a low predetermined value. A number of alternate control logic systems may be used.

In passing only a portion of the rich absorbent stream in heat exchange with the hot lean absorbent, the same or nearly the same amount of heat is obtained from the hot lean stream that would have been obtained by exchanging it with the entire rich absorbent stream. This is accomplished by operating the exchanger at a pressure on the rich liquid side only slightly above the pressure in the regenerator column, thereby permitting vaporization to occur, absorbing additional heat in the form of latent heat of vaporization, while limiting the temperature rise of the rich absorbent liquid.

The low reflux ratio that results from passing an unheated portion of the rich absorbent solution to the top of the regenerator column and maintaining the vapor temperature at a small increment above the liquid temperature does not result in impaired stripping, contrary to prior art teachings. However, the lower ratio of steam to liquid at the bottom of the regenerator column which results from the lower energy used for this process may result in a somewhat higher residual level of acid gas in the stripped lean solution. However, the resulting level is still low enough to be acceptable in most situations, and can in any case be compensated for by using a somewhat lower temperature on the cooled lean stream to the absorber column.

BRIEF DESCRIPTION OF THE DRAWINGS

FIG. 2 presents a curve showing how heat requirement of the split stream system varies with the fractional split of the spent impurity-rich absorbent liquid from the absorber column that is sent to the spent/lean heat exchanger, while supplying just enough heat to the reboiler to keep the vapor/liquid temperature differences at either the intermediate or the top points of the regenerator column at a minimum value of 2° F. The minimum heat requirement is obtained when both temperature differences are at 2° F.

DETAILED DESCRIPTION OF THE INVENTION

Figure 1:
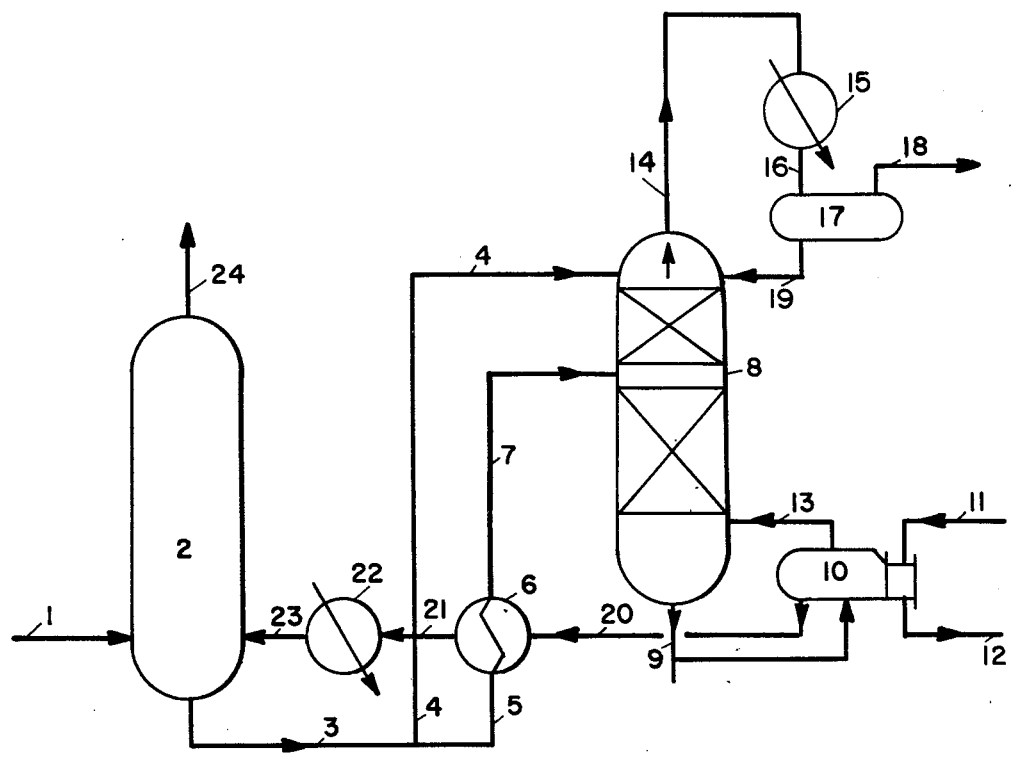
FIG. 1 presents a schematic flow diagram of the split stream approach in the process of the claimed invention.

The central objective of the process of the claimed invention is to minimize the heat energy requirements associated with removal of impurities from a gaseous or liquid stream by an absorbent liquid and the regeneration of that absorbent liquid for further use in the removal of impurities. The objective is attained in the process of the claimed invention by designing for the following carefully controlled modes of operation.

Operating with a portion of the spent rich absorbent transported directly without prior heating to the top of the regenerator column while the other portion of the spent rich absorbent is transported through a lean/spent heat exchanger which preheats it prior to its being transported to an intermediate lower point of the regenerator column.

Operating at the top of the regenerator column with the temperature elevation of the vapor from the top maintained at a very small differential, 1° to 15° F., above the temperature of the unheated portion of the spent solution entering the top, so as to maintain the reflux ratio at its minimum value.

Operating at the intermediate point in the regenerator column, where the preheated portion of the spent solution is introduced, with the temperature elevation of the vapor from the bottom portion of the regenerator column maintained at a very small differential, 1° to 15° F., above the temperature of the preheated portion of the spent solution entering the intermediate point, so as to maintain the split between unheated and preheated portions of the rich solution at the value which results in the lowest energy requirement for the system.

By stripping the spent amine absorbent stream, a portion being transported to the top of the regenerator column without prior heating and a portion going to a heat exchanger where it is partially heated by taking on heat which is given up by the lean absorbent solution, overall heat requirements are reduced. The portion of the spent amine solution which passes through the heat exchanger picks up heat from the lean amine solution which heat would otherwise be passed out of the system. The colder temperature at the top of the regeneration zone occasioned by not heating a portion of the spent amine solution allows for the condensation of a greater amount of steam vapors which would pass out of the regeneration zone as "saturation" steam than would be condensed if a hotter preheated stream were passed to the top of the column.

Thus, in the process of the claimed invention, optimum heat recovery from the hot regenerated "lean" solution is attained, while "saturation" steam losses are minimized so as to reduce the overall steam requirements by as much as 25%. The process can be better understood by reference to the following detailed description.

The feedstocks which can be purified according to this invention include any hydrocarbon gas or liquid such as natural gas, refinery gas streams, liquified petroleum gas streams such as propane, butane, nonhydrocarbon gas streams, synthetic gas streams, products of coal gasification, liquefaction, etc.

The absorbent liquid may be comprised of any of a number of alkanolamines among which are monoethanol amine, diethanol amine, diisopropanol amine, methyldiethanol amine and diglycol amine with monoethanol amine being especially preferred.

The principal impurities which will be removed from hydrocarbon liquid gases and others are $H_2S$, $CO_2$ and mixtures thereof. The process of the claimed invention can be better understood by reference to the following detailed description.

Referring to FIG. 1, sour gas is introduced via line 1 into absorption column 2 where it is contacted with an alkanolamine solution. The amine concentration in the aqueous solution may be from 15 to 70 weight percent, preferably 20 to 50 weight percent. The lean amine solution is cooled in cooler 22 and enters the absorber column via line 23. The pressure at which the absorber column is operated can be any pressure from 10 psig up, depending on the pressure at which the feed stream being purified is available. For gases, the higher the pressure, the higher the driving force for acid gas absorption. Pressures above 50 psig are preferable, above 400 psig most preferable. For liquids such as liquid propane or butane, the pressure must be high enough to prevent vaporization at the highest temperature reached in the absorber. Pressures above 200 psig are preferable for propane, above 50 psig for butane.

To obtain maximum cleanup of the treated fluid, and maximum acid gas absorption capacity of the amine solution, the lean amine solution should be cooled to a temperature below 120° F., preferably below 110° F. As the absorbent liquid passes down the absorber column, acid gas impurities will be absorbed, with an accompanying heat release due to the heat of reaction of acid gas with amine. Some portion of this heat will be taken up by the absorbent liquid, so that it will leave the bottom of the absorber column at a temperature higher than that at which it entered. The more acid gas absorbed per gallon of absorbent liquid circulated, the higher this temperature will be. The enriched solution leaving the bottom of the absorber column may be at a temperature of 115° to 200° F., preferably 130° to 175° F.

The warm enriched absorbent solution passes out of absorber column 2 into line 3, where it is split into two streams; one stream passing into line 4 and the other stream passing into line 5. The stream passing into line 4 is transported directly to the top of regenerator column 8 without additional heating. The stream passing into line 5 is passed through heat exchanger 6 where it is heated by exchange with the hot lean solution coming from reboiler 10.

The heat recoverable by exchange from the hot lean solution is limited by the temperature of the rich solution from the absorber column as it enters the heat exchanger. The degree of approach to this temperature that is attained by the lean solution will be determined by the amount of heat transfer surface provided. In design, it is normal practice to select an optimum temperature approach by making an economic balance between the cost of additional heat exchanger surface and the value of additional heat recovered. Temperature approaches of 25° to 75° F. have been used.

In the process of this invention, where only a portion of the rich stream is passed through the heat exchanger, reduction in the amount of heat recovered is avoided by reducing the pressure on the rich solution side of the exchanger to a level just sufficient to induce flow from the exchanger outlet to the top of the regenerator column, thereby permitting vaporization to occur in the exchanger. The latent heat of vaporization of the portion of the water and acid gas that is vaporized adds to the heat capacity and the rich stream without a corresponding increase in its temperature. The amount of heat recovered by the partial flow of rich solution through the exchanger is therefore approximately the same as would be obtained with full flow of the rich stream through the exchanger and no vaporization, with the same amount of heat transfer surface, and with the same temperature approach at the cold end.

From the outlet of exchanger 6, the heated portion of the rich solution stream passes via line 7 to an intermediate point of regenerator column 8. Here the vapor portion of the stream joins with the vapor rising from the bottom section of the regenerator column, and the total vapor stream passes upward through the upper portion of the regenerator column, where it gives up heat to the portion of the spent absorbent solution that was passed unheated to the top of the regenerator column, and where it strips out acid gas from that solution. The contacting height provided in the upper portion of the regenerator column is sufficient to provide a close temperature approach between the vapor entering the bottom of the contacting zone and the liquid leaving it, and also to permit stripping of the acid gas down to a close approach to its equilibrium level.

The liquid portion of the stream entering the intermediate point in the regenerator column via line 7 joins with the liquid flowing from the top portion of the regenerator column and the total liquid stream flows down through the bottom portion of the regenerator column where it is heated up and stripped of all but a small residual amount of its acid gas content by countercurrent contact with the vapor generated in the reboiler 10.

Control of the split between the unheated stream of rich solution flowing to the top of the regenerator column and the preheated stream flowing to the intermediate point, and of the quantity of heating medium, from line 11, flowing to reboiler 10, is effected by continuously measuring the temperature of the vapor leaving and the liquid entering the top of the regenerator column, and determining the difference between them, and also continuously measuring the temperature of the vapor leaving and the liquid entering the bottom portion of the regenerator column at the intermediate point where the heated portion of the solution enters via line 7, and determining the difference between them. The optimum operation, with the minimum amount of heating medium to reboiler 10, will be obtained when these two temperature differences are zero. However, it is not practically possible to use zero as a control point, since a deficiency of heating medium would not be detectable, because the vapor temperature can never be lower than the corresponding liquid temperature. It is therefore required for practical reasons to control the vapor temperature a small finite amount higher than the liquid temperature at both points. A temperature difference of 1° to 15° F. may be used; preferably 2° to 5° F.

Control of the top temperature difference can be effected by adjusting the split between unheated and heated rich solution, with the flow of unheated solution to the top being decreased if the top temperature difference falls below the selected control value. Control of the intermediate point temperature difference would then be effected by adjusting flow of heating medium, line 11, to the reboiler 10, with flow of heating medium being increased if the temperature difference at the intermediate point falls below the selected control value.

Alternatively, the control functions can be reversed, with the top temperature difference being used to control flow of heating medium to the reboiler, and the intermediate temperature difference to control the split between unheated and heated rich solution.

FIG. 2 shows how the heat requirement of the system is minimized when the heating medium flow to the reboiler and the split between unheated and heated rich solution are both controlled to maintain a low finite temperature difference between vapor and liquid at the top and intermediate points of the regenerator column. It can be seen that the heat requirement is at a minimum when the temperature differential approaches a$\Delta T$ of 2° F.

If the fraction of the spent rich stream that is sent to the sent/lean heat exchanger is reduced below the optimum value, the increase in flow of the unheated portion of the spent rich stream to the top of the regeneration column will absorb additional heat from the rising steam vapor, reducing the temperature difference between the vapor leaving and the liquid entering the top of the column, and requiring an increase in the heat input to the reboiler to maintain the top temperature difference at the predetermined low finite value. Under these conditions the temperature difference between vapor and liquid at the intermediate point of the regenerator column where the heated portion of the rich solution is introduced will rise above the predetermined low finite value.

If the fraction of the spent rich stream that is sent to the spent/lean heat exchanger is increased above the optimum value, more heat will be absorbed in the bottom portion of the regenerator column from the rising steam vapor, reducing the temperature difference between the vapor and the liquid at the intermediate point of the regenerator column, and requiring an increase in the heat input to the reboiler to maintain this temperature difference at its predetermined low finite value. Under these conditions the temperature difference between vapor and liquid at the top of the regenerator column will rise above the desired low finite value.

The optimum split between spent rich flow through the heat exchanger and spent rich flow passed unheated to the top of the regenerator column occurs when the heat loads on the top and bottom portions of the regenerator column are balanced, and this is evidenced by equal low finite temperature differences at both the top and the intermediate points.

The un-preheated and preheated streams pass to the bottom of regenerator tower 8 where they flow via line 9 to reboiler 10 and are boiled, producing vapor, which enters the bottom of regenerator column 8 via line 13. Remaining liquid from reboiler 10 enters line 20 to be passed through heat exchanger 6 and cooler 22 back to the absorber column. The steam generated in reboiler 10 passes up through regenerator column 8, a portion of it being condensed as it gives up heat to the descending liquid, while simultaneously its volume is augmented by the accumulation of $CO_2$ and/or $H_2S$ being stripped from the liquid. The effect of maintaining the vapor/liquid temperature differentials at the top and intermediate liquid injection points at their lowest controllable values is to hold the steam generated in the reboiler at a level close to the value required to satisfy the minimum heat requirement of the system.

$H_2S$ and/or $CO_2$ and steam vapors pass out of the regenerator column 8 via line 15 into overhead condenser 15 where the steam is condensed and $H_2S$ and $CO_2$ impurities and mixtures thereof remain in gaseous form. The stream condensate is collected in accumulator 17 and the $H_2S$ and $CO_2$ impurities pass out of accumulator 17 via line 18. The steam condensate is returned to regenerator 8 via line 19, maintaining a water balance on the system. The purified lean amine solution which had passed through heat exchanger 6 and cooler 22, exits via line 23 and enters lean amine absorber column 2 to be reused in the process, the purified hydrocarbon exiting via line 24.

The examples in Table I serve to illustrate the reduction in energy requirement obtained from operating in the manner described in the outlined invention. The examples show the energy requirement for regenerating a 20 weight percent monoethanolamine solution in a twenty tray regenerator column operating at a top pressure of 15 psig and a reboiler pressure of 19 psig. In all examples the spent rich solution contains 0.7 mols of $H_2S$ per mol of monoethanolamine, and leaves the bottom of the absorber column at a temperature of 172° F., corresponding to a lean absorber inlet temperature of 120° F. The attainment of a 0.7 mol $H_2S$/mol amine loading in the absorber column would require that the partial pressure of $H_2S$ in the sour gas feed to the absorber be at least 10 psia, or in the case of a liquid feed, that the $H_2S$ concentration be at least 1 weight percent. For lower or higher $H_2S$ concentrations, correspondingly lower or higher rich loadings would be used. The range that would be suitable is from 0.3 to 0.9 mols $H_2S$/mol amine.

EXAMPLE 1

Example 1 shows the heat requirement for operation in accordance with prior art U.S. Pat. No. 3,690,816, in which the spent/lean heat exchanger is eliminated in order to reduce capital costs. The spent rich solution is passed directly to the top of the regenerator column without prior heating.

The heat requirement of the system includes 733 BTU/gallon to heat the solution from the absorber bottom temperature of 172° F. to a reboiler temperature of 262° F.; 419 BTU/gallon for the heat of reaction required to vaporize $H_2S$ from a rich loading of 0.7 mols/mol amine down to a lean loading of 0.046 mols/mol amine; and 85 BTU/gallon representing the latent heat content of the saturation steam leaving the top of the regenerator column at a temperature 2° F. higher than that of the incoming rich solution. The total heat requirement of 1237 BTU/gallon of solution amounts to 2023 BTU/pound of $H_2S$ removed.

The lean loading of 0.046 mols/mol amine has been determined by calculation using a regeneration model based on classical theory and verified by commercial plant experience.

To illustrate the acceptability of a lean loading of 0.046 mols $H_2S$/mol amine, the Table shows that the equilibrium concentration of $H_2S$ in the gas above this solution in an absorber column operating at 1000 psig would be 3.9 volume parts per million at 120° F. and 2.0 volume parts per million at 100° F. These represent the lowest levels to which $H_2S$ could be scrubbed with this lean solution in an absorber operating at 1000 psig.

EXAMPLE 2

Example 2 shows the heat requirement for regenerating the same rich monoethanolamine solution as in Example 1, with the exception that the spent/lean heat exchanger on the full flow of spent rich solution is used, as in known conventional operations. The heat exchanger is sized to give a temperature approach at the cold end between the lean and the rich solutions of 48° F., which is in line with conventional practice.

The heat requirement of the system includes 733 BTU/gallon to heat the solution from the absorber bottom temperature to the temperature of the reboiler, the same as Example 1; 414 BTU/gallon for heat of reaction of the $H_2S$, slightly less than Example 1 because the net $H_2S$ pickup per gallon in this example, with a lean loading of 0.054, is slightly less than Example 1; and 193 BTU/gallon representing the latent heat content of the saturation steam leaving the top of the regenerator column at a temperature 2° F. higher than that of the incoming rich solution. A small amount of vaporization will take place on the rich solution side of the heat exchanger, resulting in a slight increase in heat recovered over what would be obtained with no vaporization. However, a part of this heat generates steam which passes directly overhead and represents an additional heat loss of 25 BTU/gallon from the system.

The gross heat requirement of this scheme is 1365 BTU/gallon, of which 342 BTU/gallon is recovered in the heat exchanger, requiring a net input of heat to the reboiler of 1023 BTU/galon, which amounts to 1694 BTU/pound of $H_2S$ removed, 16% less than Example 1.

The lower ratio of steam to gallons of solution in this example results in a slightly higher lean solution loading of 0.054 mols $H_2S$/mol amine. For this slightly higher loading, the equilibrium levels of $H_2S$ in a 1000 psig absorber would be 5.2 volume parts per million at 120° F. and 2.8 volume parts per million at 100° F.

EXAMPLE 3

Example 3 regenerates the same rich monoethanolamine solution as Examples 1 and 2, using the manner of operation described in this invention. A spent/lean heat exchanger with the same surface as in Example 2 is used. A 0.53 fraction of the total spent rich solution passes through the exchanger and is sent to an intermediate point in the regenerator column, while the remainder of the spent rich solution is passed without prior heating to the top of the regenerator column. Because of the reduced flow of rich solution through the exchanger as compared with Example 2, the outlet temperature on the rich side is higher, and a higher degree of vaporization of water and $H_2S$ occurs, but the total exchanger duty is slightly less than Example 2, and the temperature approach at the cold end is 52° F.

The heat requirement of the system includes 733 BTU/gallon to heat the solution from the absorber bottom temperature to the temperature of the reboiler, the same as Examples 1 and 2; 411 BTU/gallon for heat of reaction of the $H_2S$, slightly less than Examples 1 and 2 because of the slightly higher lean loading of 0.059; and 83 BTU/gallon representing the latent heat content of the saturation steam leaving the top of the regenerator column at a temperature 2° F. higher than that of the incoming unheated portion of the rich solution.

The steam vaporized in the exchanger does not represent a heat demand on the system in Example 3, since it is passed into the regenerator column at an intermediate point, and subsequently contacts the unheated portion of the spent rich solution, whereby all but the amount required to saturate the top vapor is condensed.

The gross heat requirement of this scheme is 1227 BTU/gallon, of which 312 BTU/gallon is recovered in the heat exchanger, requiring a net input of heat to the reboiler of 915 BTU/gallon, which amounts to 1527 BTU/pound of $H_2S$ removed, 25% less than Example 1, and 10% less than Example 2. The lean solution loading for this steam ratio is 0.059 mols $H_2S$/mol amine, for which the corresponding equilibrium levels of $H_2S$ in a 1000 psig absorber would be 6.2 volume parts per million at 120° F. and 3.3 volume parts per million at 100° F. By comparing these values with those of Example 2, it can be seen that the clean-up capability of a solution regenerated according to the process of this invention can be made equivalent to that of known conventional practice by only a minor reduction in the lean solution temperature.

These examples illustrate the advantage of the process of this invention in energy savings over the known art of acid gas removal by amine treating. However, the heat requirement shown in these examples are not the minimum attainable. Additional savings can be obtained, where conditions permit, by operating with higher amine solution strength, with higher rich solution acid gas loading, or with more heat exchanger surface.

TABLE I

HEAT REQUIREMENT FOR MONOETHANOLAMINE REGENERATION

| Example | 1 (U.S. Pat. 3690816) | 2 (Full Rich Flow to Exchanger) | 3 (Split Rich Flow to Exchanger) |
|---|---|---|---|
| Solution Wt. Percent MEA | 20 | 20 | 20 |
| Rich Solution Loading-Mol $H_2S$/Mol MEA | 0.7 | 0.7 | 0.7 |
| Rich Solution Temperature, °F. | 172 | 172 | 172 |
| Fraction of Rich to Exchanger | 0 | 1 | 0.53 |
| Exchanger Cold End Temp. Approach, °F. | — | 48 | 52 |
| Exchanger Rich Outlet Temp., °F. | — | 205 | 219 |
| Regenerator Top Pressure, psig | 15 | 15 | 15 |
| Regenerator Vapor Temp.-Intermediate, °F. | — | — | 221 |
| Regenerator Vapor Temp.-Top, °F. | 174 | 207 | 174 |
| Reboiler Temp., °F. | 262 | 262 | 262 |
| Heat Requirement-BTU/Gallon Solution | | | |
| Sensible Heat-Abs. Bott. to Reboiler | 733 | 733 | 733 |
| Heat of Reaction of $H_2S$ | 419 | 414 | 411 |
| Saturation Steam at Regen. Top | 85 | 193 | 83 |
| Steam Vaporized in Exchanger | — | 25 | — |
| Gross Heat Requirement | 1237 | 1365 | 1227 |
| Heat Recovered in Exchanger | — | 342 | 312 |
| Net Reboiler Heat Required | 1237 | 1023 | 915 |
| Lean Solution Loading-Mol $H_2S$/Mol MEA | .046 | .054 | .059 |
| Net Heat Requirement BTU/Lb $H_2S$ | 2023 | 1694 | 1527 |
| Lean Temperature to Absorber, °F. | 120 | 120 | 120 |
| Equilibrium VPPM $H_2S$ at 1000 psig, 120° F. | 3.9 | 5.2 | 6.2 |
| Equilibrium VPPM $H_2S$ at 1000 psig, 100° F. | 2.0 | 2.8 | 3.3 |

What is claimed is:

1. In a process for regenerating a spent aqueous amine absorbent liquid containing acid gas impurities such as hydrogen sulfide and carbon dioxide by stripping said acid gas impurities from said spent amine absorption liquid in a regeneration tower, the improvement which comprises:

contacting pure absorbent amine solution in an absorption zone with $H_2S/CO_2$ impurities and mixtures thereof to achieve a loading of ranging from 0.3 to 0.9 moles of acid gas per mole of absorbent amine solution, splitting said spent absorbent liquid stream such that at least a portion of said spent absorbent stream passes directly to the top of said regeneration tower without prior heating, and at least a portion of said spent absorbent stream is heated by its passage through a heat exchanger en route to an intermediate point of said regeneration tower, continuously measuring the temperature difference between the liquid entering and the vapor exiting overhead at the top of said regeneration tower, and also continuously measuring the difference in temperature between the combined mixture of the vapor rising from the bottom of said regeneration tower plus the vapor entering at the intermediate point and the liquid entering at said intermediate point, such that the temperature differentials at both the top and intermediate points of said regeneration tower are maintained at temperatures ranging from 1° to 15° F.

2. The process of claim 1, wherein the absorbent amine solution is selected from the group comprising monoethanol amine, diethanol amine, diisopropanol amine, methyldiethanol amine, diglycol amine.

3. The process of claim 2, wherein the acid gas impurities absorbed comprise $H_2S$, $CO_2$ and mixtures thereof.

4. The process of claim 1, wherein the fraction of spent absorbent amine solution passing through the heat exchanger is about 0.53 and the fraction going directly to the top of said regeneration tower is about 0.47.

5. The process of claim 4, wherein the temperature approach of the hot spent absorbent amine solution and the lean pure amine solution is 52° F.

6. The process of claim 5, wherein both the temperature differential at the top of said regeneration tower and the temperature differential at the intermediate point of said regeneration tower are maintained within the range of from 2° to 5° F.

7. The process of claim 2, wherein the amine absorbent liquid is monoethanol amine.

* * * * *